United States Patent
Lahoda et al.

(10) Patent No.: US 8,638,901 B2
(45) Date of Patent: Jan. 28, 2014

(54) OPTIMUM CONFIGURATION FOR FAST REACTORS

(75) Inventors: Edward J. Lahoda, Edgewood, PA (US); Mario D. Carelli, Wexford, PA (US); Matthew J. Memmott, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 518 days.

(21) Appl. No.: 12/980,398

(22) Filed: Dec. 29, 2010

(65) Prior Publication Data

US 2012/0170705 A1 Jul. 5, 2012

(51) Int. Cl.
*G21C 15/02* (2006.01)
*G21C 1/01* (2006.01)
*G21C 1/02* (2006.01)
*G21C 15/00* (2006.01)
*G21C 1/00* (2006.01)

(52) U.S. Cl.
USPC ........... 376/396; 376/327; 376/328; 376/330; 376/347; 376/361; 376/395

(58) Field of Classification Search
USPC ......... 376/347, 361, 395, 396, 911, 277, 287, 376/293, 327–330, 346, 397, 398, 348
See application file for complete search history.

(56) References Cited

U.S. PATENT DOCUMENTS

| | | | | |
|---|---|---|---|---|
| 3,149,044 | A * | 9/1964 | De Boisblanc et al. | 376/346 |
| 3,232,843 | A * | 2/1966 | Went et al. | 376/911 |
| 3,297,540 | A * | 1/1967 | Williams et al. | 376/398 |
| 3,366,545 | A * | 1/1968 | Lewis et al. | 376/911 |
| 3,968,653 | A | 7/1976 | Cachera | |
| 4,508,677 | A | 4/1985 | Craig et al. | |
| 4,859,402 | A | 8/1989 | Tupper et al. | |
| 4,949,363 | A | 8/1990 | Tupper et al. | |
| 4,968,476 | A * | 11/1990 | Radkowsky | 376/348 |
| 5,013,519 | A * | 5/1991 | Nakamura et al. | 376/911 |
| 5,021,211 | A | 6/1991 | Hunsbedt et al. | |
| 5,043,135 | A | 8/1991 | Hunsbedt et al. | |
| 5,043,136 | A | 8/1991 | Hunsbedt et al. | |
| 5,112,569 | A * | 5/1992 | Cinotti | 376/328 |
| 5,940,463 | A | 8/1999 | Muramatsu | |
| 6,327,323 | B1 * | 12/2001 | Rohde et al. | 376/293 |

* cited by examiner

*Primary Examiner* — Bernarr Gregory
(74) *Attorney, Agent, or Firm* — Joseph C. Spadacene; Westinghouse Electric Company LLC

(57) ABSTRACT

A nuclear reactor having a liquid metal or molten salt coolant in a riser space 130', has a cylindrical containment vessel 134 with a reactor vessel 120', at least two lobes 121, preferably three to nine lobes 121, each lobe 121 interconnected with the other lobe(s) and each containing a fast reactor core, 116', 116", 116'" and 116"".

13 Claims, 3 Drawing Sheets

OPTIMUM CONFIGURATION FOR FAST REACTORS

BACKGROUND OF THE INVENTION

1. Field of the Invention

The present invention relates to new and improved reactor core designs for fast reactors, particularly liquid metal or molten salt cooled nuclear reactors.

2. Description of the Prior Art

As described in Westinghouse U.S. Pat. No. 4,949,363 (Tupper et al.), a liquid metal-cooled nuclear reactor (LMR), like other nuclear reactors, operate at temperatures up to 538 C.° (1,000° F.), and produces heat by fissioning of nuclear materials which are fabricated into fuel elements and assembled within a nuclear reactor core situated in a reactor vessel. The heat produced by the LMR is used to generate electricity.

Liquid sodium has excellent heat-transfer properties and low vapor pressure at temperatures of interest for power generation, and is abundant, commercially available in acceptable purity and is relative inexpensive, making it an attractive medium as a reactor coolant, for LMRs, however, it does react violently with water which imposes problems in the design of sodium-to-water steam boilers. In addition, the control of the nuclear process in fast reactors is inherently hard as compared to light water thermal reactors. In order to minimize the risk of a coolant loss due to the rupture of one of the main coolant circulating lines, a pool type reactor is favored over a loop type system.

A schematic of a pool type fast reactor vessel is shown in prior art FIGS. 1 and 1A and described by Hunsbedt et al. (U.S. Pat. No. 5,043,135). FIG. 1 shows one type of a passively cooled liquid nuclear reactor 10 containing a circular reactor vessel 12 containing a pool of liquid metal coolant 14 such as sodium metal or sodium/potassium, for heat transfer, in which is immersed nuclear core 16 containing fissionable fuel. Fission action rate is governed by neutron absorbing control rods, generally shown as 18, moving from or into the nuclear core 16. The reactor vessel 12 is enclosed within a concentric containment vessel 20 in spaced apart relationship all within collector cylinder 22. A silo 24 of, for example concrete, houses the collector cylinder 22 as shown. As shown in FIGS. 1 and 1A, a series of annular downer partitions 28 and riser partitions 30 are formed by this concentric arrangement which partitions form cycling fluid circuit paths. Volume 32 contains cool ambient air 34, which, upon heating, induces a natural convection passing around the bottom of containment collector cylinder 22 and up annular riser partition 30, as shown by the arrows in FIGS. 1 and 1A, to an outlet shown generally as 36. As such, the cooling system is entirely passive and operates continuously by convection and thermal radiation. This prior art, standard design, can be placed in the ground 33.

Conventional nuclear reactors have utilized a variety of elaborate energy driven cooling systems to dissipate heat from the reactor, such as Cachera (U.S. Pat. No. 3,968,653). Liquid metal cooled reactors such as the modular type are disclosed by U.S. Pat. No. 4,508,677, utilizing sodium or sodium-potassium as the coolant.

Passive safety of fast reactors rely on removing "decay heat" through the reactor vessel. Heat continues to be generated by the core even after the fission reactor has stopped. It is important that this decay heat (reactor residual heat/fission product decay heat) can always be removed after reactor shutdown caused by an accident or fault condition. A passively cooled fast reactor system primarily operates continuously through the process of natural convection in fluids, conduction and thermal radiation. Here, decay heat is transported from the heat producing reactor fuel core out to the reactor vessel by means of natural convection flow of the coolant through the primary cooling circuit loop. The transported heat is in turn conducted out through the wall of the reactor vessel and on through the air filled space intermediate the reactor and containment vessel wall is continued on into the surrounding atmosphere, by natural convection to the naturally convecting surrounding air and partially by thermal radiation.

The critical parameter in passive safety is the ratio of the surface area of the reactor vessel outer wall 12 to volume of the core 16 ratio. Since fast reactor cores are very compact, this fact has limited the maximum power that is available while still maintaining a passively cooled core to about 1000 MW (megawatts) thermal. One such type reactor, as described by Hunsbedt (U.S. Pat. No. 5,021,211) undertakes to maintain the bulk of the metal coolant at temperatures below safe limits. Although higher power levels should reduce the capital and operating costs of the fast reactor, high fuel core temperature peaks would be likely to occur if the liquid metal coolant flow through the core is terminated. Thus, removal of decay heat from the fuel core is primarily by heat conduction through an extensive mass of enclosing stainless steel, perhaps eight inches total, which would require a temperature difference between the opposite surface areas of approximately 700° F. (371° C.) to transport the heat from within the core region to an exterior region. Other patents in this area, include, for example, U.S. Pat. Nos. 4,859,402 (Tupper et al.); 5,043,136 ( Referring now to prior art FIG. 2, a general, simplified cross-section of a prior art reactor configuration is shown with a reactor core 116, having a center 117 with liquid metal or salt coolant 114 contacting the fuel and the reactor vessel 120, the inside of the containment vessel 122, with air coolant contained in the annular riser space 130 where entry cool air contacts the outside of the reactor vessel. The radius=1.0 from the core center to the interior of containment collector cylinder 122. Point of cool air contact 134 is shown on cylinder 122.

To reiterate:
1. LMRs have high power density (fast spectrum) and need very effective coolant such as liquid metal or molten salt.
2. If the coolant flow is lost to the LMR, the problem is potentially more severe than for water reactors.
3. Therefore, LMRs require an auxiliary coolant system in case the main one (steam generators) is lost.
4. There are two LMR configurations: loop, which is similar to a PWR and pool which is similar to a BWR.
5. A pool configuration is more effective in removing heat if the coolant flow is lost, because the liquid metal can conduct the heat from the core to the vessel wall where it is taken out by radiation and flow convection.
6. The critical parameter for the pool configuration conduction of heat out is the surface (inner vessel wall) to volume (core) ratio. That is surface area in meters square of inner vessel wall: volume in meters cubed ($m^3$) of the reactor core. The higher the ratio, the more effective the heat removal.
7. Parametric analyses have indicated that 1000 MWt is about the optimum for a pool reactor. Lower powers lack in economics, higher powers give more safety problems;
8. All designs teach concentric volumes from the core outward.

Thus, there is a need for a new, simpler and revolutionary LMR design, to maximize heat removal efficiencies and be cost effective and commercial. It is a main object to provide a new, innovative simpler core design for LMRs.

SUMMARY OF THE INVENTION

The above needs are met and above object accomplished by providing, in its broadest embodiment, a liquid metal or molten salt cooled nuclear reactor comprising a generally cylindrical containment vessel with a multi-lobed reactor vessel with at least two lobes each lobe interconnected with the other lobe and each lobe containing a fast reactor core. There can be three to nine lobes, preferably three to six lobes, most preferably four or five lobes. This is thought to be of revolutionary design and unprecedented in nuclear concept; not even obvious to try.

The invention also resides in a liquid metal or molten salt cooled nuclear reactor comprising a multi-lobed reactor vessel, in a closed bottom containment vessel having a cylindrical wall for holding a pool of liquid metal or molten metal salt coolant; the multi-lobed reactor vessel having at least two lobes each lobe interconnected with the other lobe and each lobe containing a fast reactor core. These cores can be run as a single unit, that is all together, or independently. This approach effectively increases the ratio of the surface area of the inner wall of the reactor vessel exterior to volume of the reactor cores, allowing significantly higher thermal powers within a given containment volume, thereby decreasing the capital cost. The closed bottom container may be further contained in a concentric containment vessel surrounded by riser portions/partitions cooled by air. Generally, the containment vessel will have a cylindrical wall. While liquid sodium is preferred, alternatives to sodium include but are not limited to sodium and potassium liquid molten metals such as lead or lead/bismuth alloys, molten salts such as NaF, KF and other molten salts.

There seems to be no prior art suggestion to try anything other than concentric designs. Prior art would appear to teach away from the dramatically different lobe design of this invention. The lobes are not a design function but contribute in a dramatic fashion to the efficiency of the reactor.

BRIEF DESCRIPTION OF THE DRAWINGS

The invention will be more fully understood by reference to the attached drawings in which.

DESCRIPTION OF THE PREFERRED EMBODIMENTS

Figure 1:
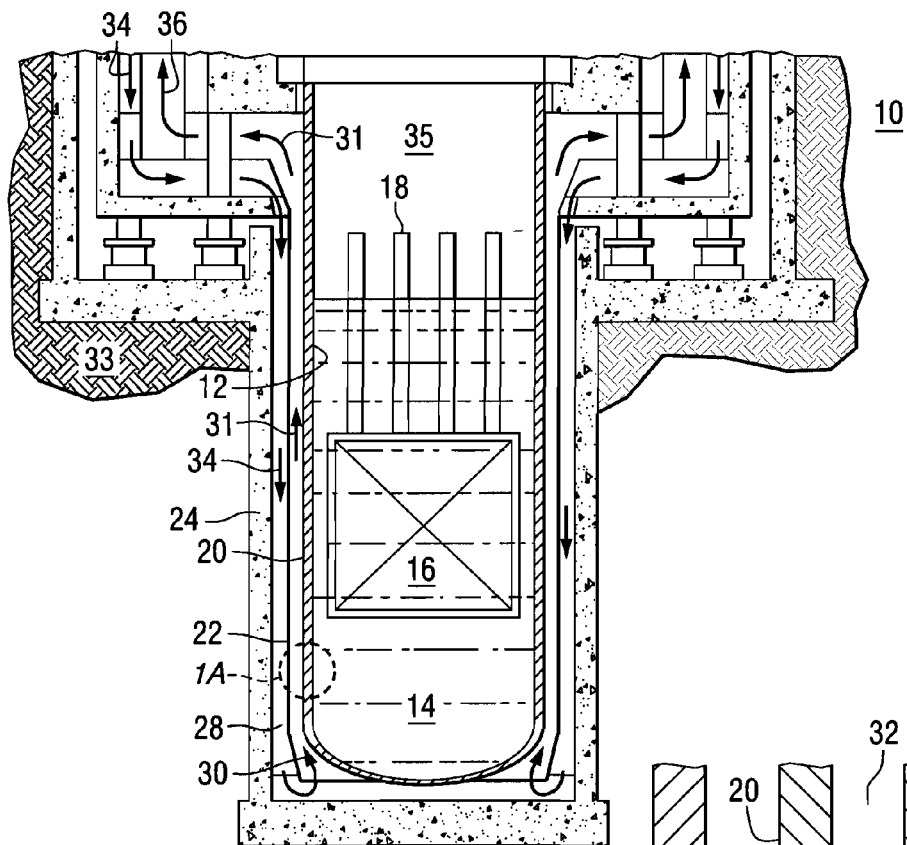
FIG. 1 is a schematic illustration of the bottom portion of a liquid metal or salt cooled nuclear reactor in cross section.
Figure 1A:
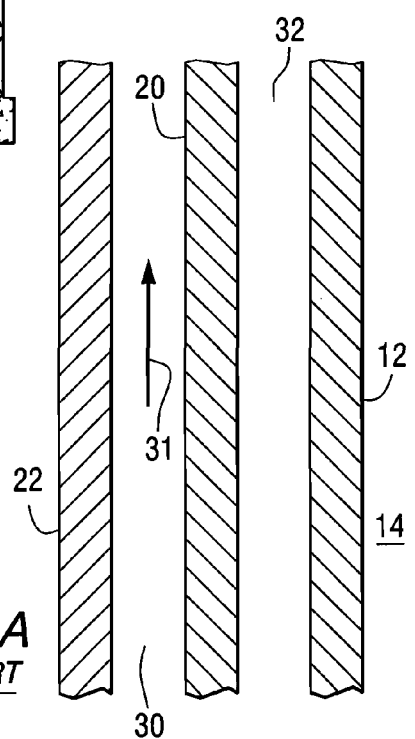
FIG. 1A is a schematic illustration of a part of FIG. 1 showing annular cooling riser partitions as related to the molten metal or salt coolant.
Figure 2:
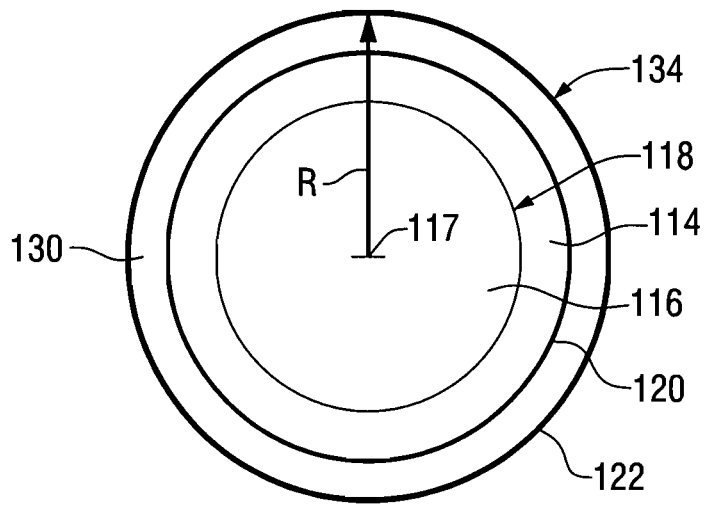
FIG. 2 is a general, simplified schematic of a cross-section of a prior art configuration showing the radius of the outer reactor wall in relation to the core center.
Figure 3:
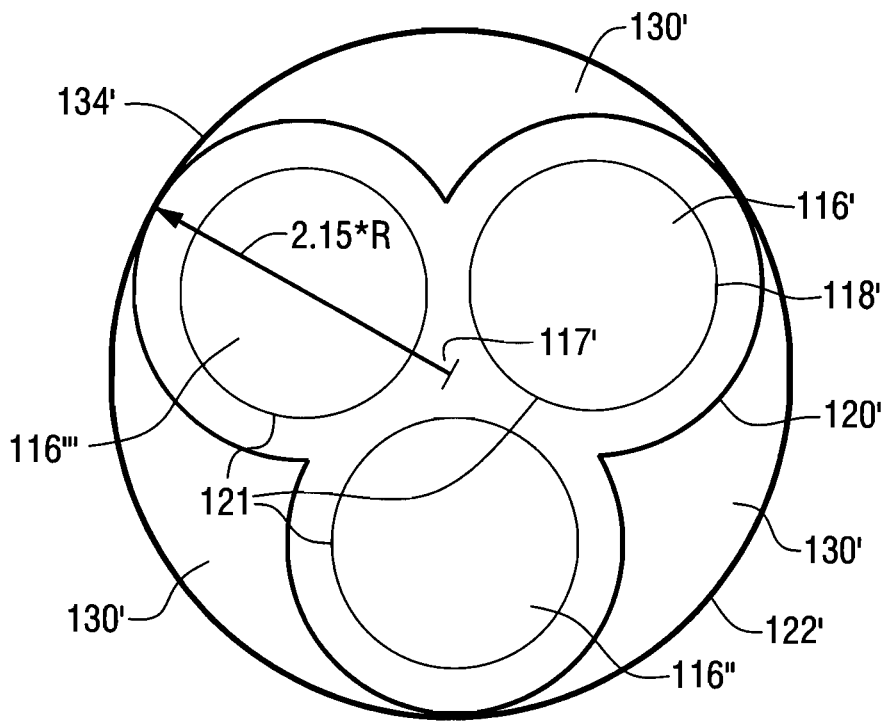
FIG. 3, which best shows the invention, is a general, simplified schematic cross-section of a three-lobe fast reactor configuration.
Figure 4:
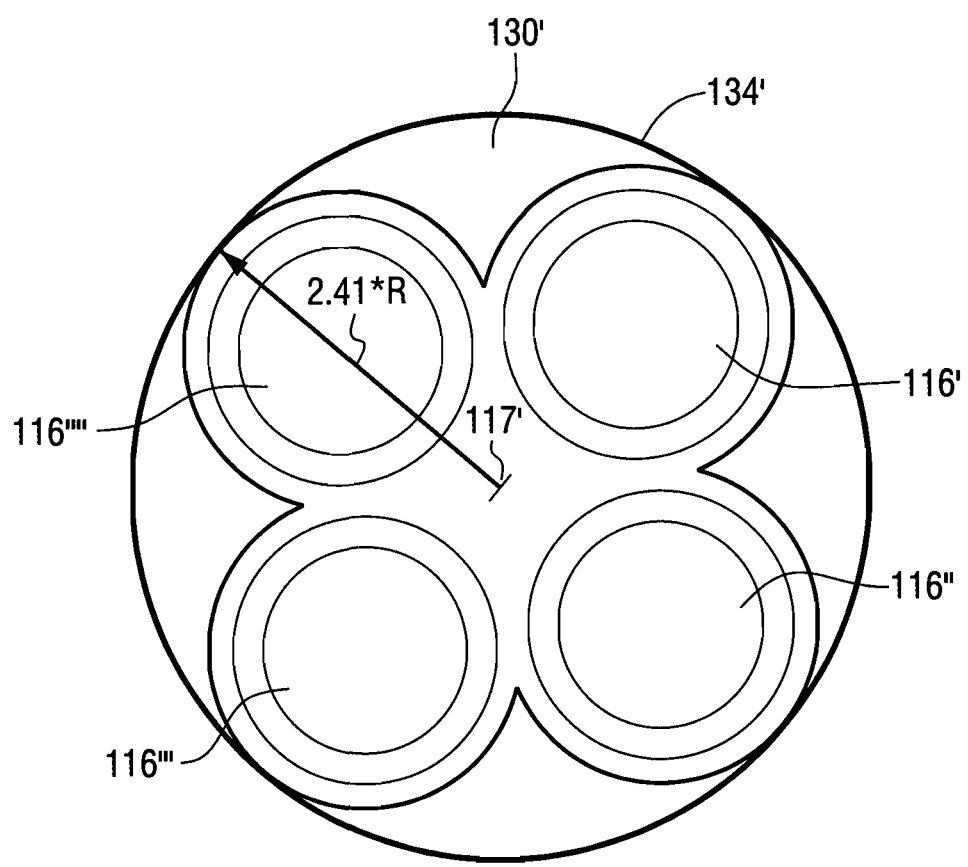
FIG. 4 is a general, simplified schematic cross-section of a four-lobe fast reactor configuration.

As regards the instant invention, FIG. 3 shows a three-lobe fast reactor configuration, having numbering similar to FIG. 2 but, for example, 134' equals 134 etc. In FIG. 3, the radius=2.15 from the common core center 117' to the interior of the containment cylinder 122'. This design has three cores 116', 116" and 116''' with liquid metal or salt coolant contacting the fuel containing lobes 121 of each core. The reactor vessel is shown as 120' and air coolant is contained in common riser space 130' with entry cool air contacting the containment cylinder 122' at point 134'. Under normal circumstances, the residual heat generated by each core will be removed by its own independent cooling device. In the case where a core has lost its cooling device, the interconnection of the cores gives access to the independent cooling devices of the other interconnected cores and, as can be seen, the air in the riser space 130' has contact in all three core areas giving more surface area for cooling of the reactor vessel. In FIG. 3, the asterisk (*) means multiply. FIG. 4 is one of the preferred embodiments of this invention with four lobes or reactors 116' to 116''''. The other preferred embodiment contains five lobes or reactors.

In the proposed new reactor geometry interconnected reactor pools are used, each having its own core which can be run either as a group or independently, all located within a single containment building. This approach effectively increases the surface area to volume ratio of the reactor allowing significantly higher thermal powers within a given containment volume, therefore decreasing the capital cost. This concept is illustrated in FIG. 3 and FIG. 4 and by the calculations below, where the relative cost advantages of three and four-lobe circular geometries have been analyzed: R=radius of reactor; H=height of reactor, *=multiply.

EXAMPLE

Analysis of an X Lobed (X Reactor) Geometry

Volume of containment(single lobe)=3.14*$H$*$(R)^2$

Volume of containment($X$ lobes)=3.14*$H$*(1/cosine (90−180/$X$)+1)$^2$

Utilizing a scale factor of 0.7 which is generally used for scaling the cost of vessels and structures:

Cost ratio $X$/1 lobe=[(1/cosine(90−180/$X$)+1)$^2$]$^{0.7}$=(1/cosine(90−180/$X$)+1)$^{1.4}$ Power ratio $X$ lobes/1 lobe=$X$/1=$X$)

Power/cost ratio $X$ lobes/1 lobe=($X$/(1/cosine(90−180/$X$)+1)$^{1.4}$.

The results of this analysis are shown in the table below. Note that for at least three lobes and up to nine lobes the power/cost ratio is higher than that for a single reactor. Thus, depending on complexity of construction, three to six lobes are most useful since increasing the number of lobes also increases the complexity of making the reactor vessel and the majority of the benefit is gained by the time a six lobed vessel is used.

| Number of Reactors (X) | Radius of Containment | Power/Cost Ratio |
|---|---|---|
| 1 | 1.00 | 1.00 |
| 2 | 2.00 | 0.76 |
| 3 | 2.15 | 1.02 |
| 4 | 2.41 | 1.16 |
| 5 | 2.70 | 1.24 |
| 6 | 3.00 | 1.29 |
| 7 | 3.30 | 1.31 |
| 8 | 3.61 | 1.32 |
| 9 | 3.92 | 1.33 |
| 10 | 4.24 | 1.33 |

-continued

| Number of Reactors (X) | Radius of Containment | Power/Cost Ratio |
|---|---|---|
| 11 | 4.55 | 1.32 |
| 12 | 4.86 | 1.31 |

The calculations presented here is an illustration of the cost advantage of the concept that is covered in this patent. The use of a multilobe system also offers additional features as compared to the single reactor system besides an improvement in containment capital cost. These include:
1. Economy of scale in the balance of plant costs for such things as turbines, generators, transformers, control systems, condensers, safety systems and licensing.
2. The space within the containment but outside the reactor vessel can serve as a heat sink during accident conditions. These areas also serve to transmit heat to the larger containment. Examples of such materials would include water (or ice) for non-sodium cooled reactors or materials such as sodium sulfate decahydrate for sodium cooled reactors.
3. Ability to use the safety systems of the unaffected reactors during a design basis event as the backup safety systems to the affected reactor.

While a full and complete description of the invention has been set forth in accordance with the dictates of the patent statutes, it should be understood that modifications can be resorted to without departing from the spirit hereof or the scope of the appended claims.

What is claimed is:

1. A liquid metal or molten salt cooled nuclear reactor comprising a generally cylindrical containment vessel with a multi-lobed reactor vessel with at least two lobes each lobe interconnected with the other lobe and each lobe containing a fast reactor core.

2. The liquid metal or molten salt coolant nuclear reactor of claim 1, wherein the lobes have a generally circular geometry.

3. The liquid metal or molten salt coolant nuclear reactor of claim 1, wherein there are three to nine lobes.

4. The liquid metal or molten salt coolant nuclear reactor of claim 1, wherein there are three to six lobes.

5. The liquid metal or molten salt coolant nuclear reactor of claim 1, wherein the liquid metal or molten salt coolant is a heat transfer material selected from the group consisting essentially of sodium, sodium and potassium, lead, lead and bismuth, sodium fluoride, potassium fluoride and potassium fluoride and mixtures thereof.

6. A liquid metal or molten salt coolant nuclear reactor comprising at least a three-lobed reactor vessel, in a closed bottom containment vessel having a cylindrical wall for holding a pool of liquid metal or molten metal salt coolant; the at least three-lobed reactor vessel having at least three lobes each lobe interconnected with the other lobe and each lobe containing a fast reactor core.

7. The liquid metal or molten salt coolant nuclear reactor of claim 6, wherein the lobes have a generally circular geometry.

8. The liquid metal or molten salt coolant nuclear reactor of claim 6, wherein there are three to nine lobes.

9. The liquid metal or molten salt coolant nuclear reactor of claim 6, wherein there are four to five lobes.

10. The liquid metal or molten salt coolant nuclear reactor of claim 6, wherein the liquid metal or molten salt coolant is a heat transfer material selected from the group consisting essentially of sodium, sodium and potassium, lead, lead and bismuth, sodium fluoride, potassium fluoride and potassium fluoride and mixtures thereof.

11. The liquid metal or molten salt coolant nuclear reactor of claim 6, wherein the liquid metal of the coolant is sodium.

12. The liquid metal or molten salt coolant nuclear reactor of claim 6, wherein the containment vessel has a cylindrical wall and four lobes.

13. The liquid metal or molten salt coolant nuclear reactor of claim 6, wherein the containment vessel has a cylindrical wall and five lobes.

* * * * *